Feb. 4, 1936.  E. W. VARS  2,029,845
GASKET FOR REFRIGERATOR CABINETS AND THE LIKE
Filed Jan. 30, 1935
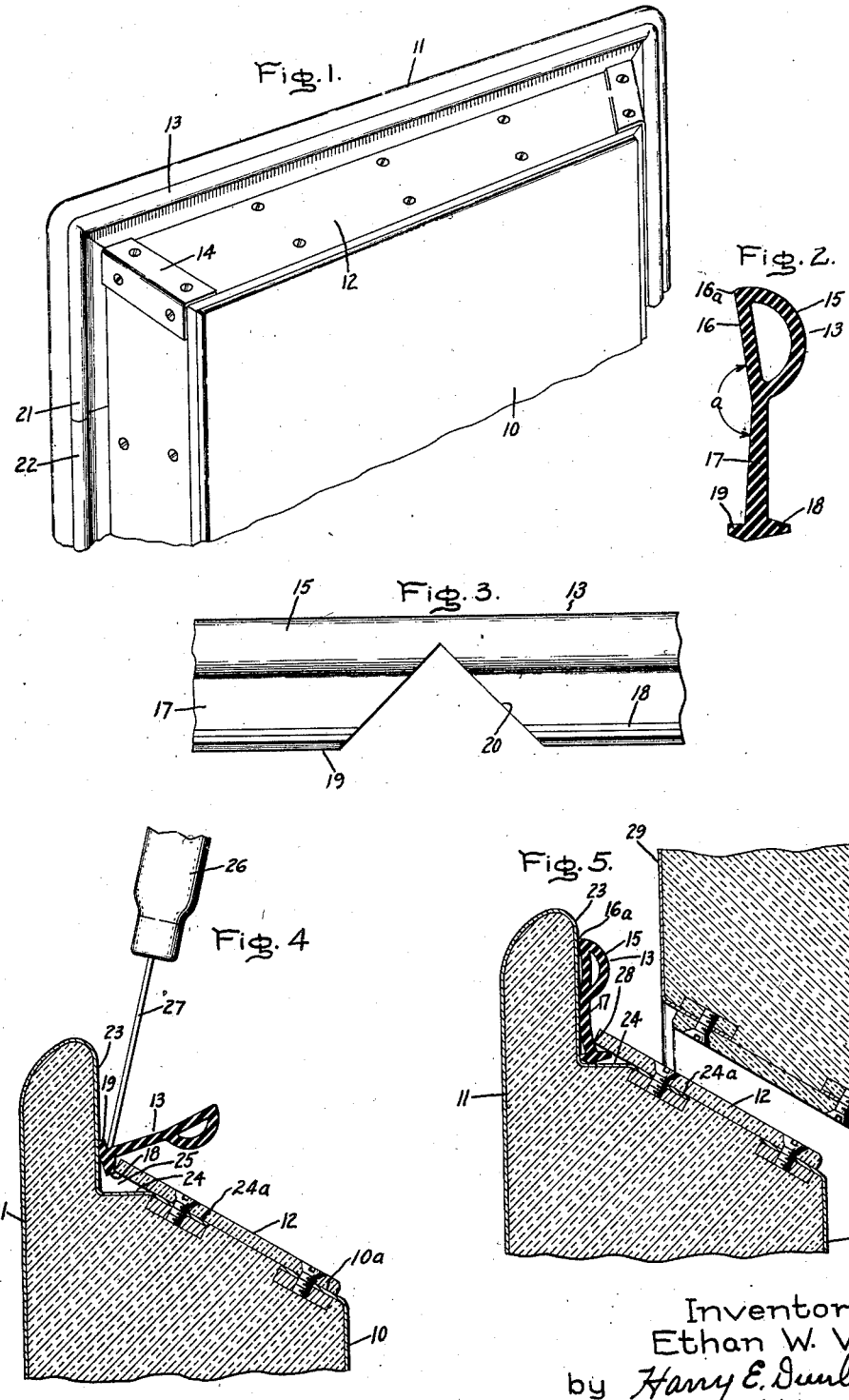
Inventor:
Ethan W. Vars,
by Harry E. Dunham
His Attorney.

Patented Feb. 4, 1936

2,029,845

UNITED STATES PATENT OFFICE 2,029,845

GASKET FOR REFRIGERATOR CABINETS AND THE LIKE

Ethan W. Vars, Erie, Pa., assignor to General Electric Company, a corporation of New York Application January 30, 1935, Serial No. 4,106

10 Claims. (Cl. 20—69)

My invention relates to gaskets for refrigerator cabinets and the like.

It is an object of my invention to provide a sealing gasket for refrigerator doors and the like, the outer edge of which shall be held securely against the door without warping, whether the door be open or closed, so as to present a pleasing appearance and to prevent the accumulation of dirt and the like beneath the gasket.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a perspective view of a portion of a refrigerator cabinet door provided with a gasket embodying my invention; Fig. 2 is an enlarged cross-sectional view of the gasket shown in Fig. 1 removed from the door; Fig. 3 is an enlarged elevational view of a portion of the gasket showing a notch for forming a corner; Fig. 4 is an enlarged cross-sectional view of the door shown in Fig. 1 showing the method of inserting the gasket in the door, and Fig. 5 is a sectional view of the door with the gasket in place when mounted on a cabinet and slightly opened.

Referring now to the drawing, in Fig. 1, I have shown a refrigerator door comprising inner and outer metal walls 10 and 11 respectively secured together by a flat strip 12 of thermally resistant material and having a gasket 13 of rubber or other suitable resilient material secured in place between the strip 12 and the outer wall 11 about the inner edge of the door. The thermally resistant material of which the strip 12 is constructed should be moisture impervious and may comprise a filler provided with a suitable binder, such as rubber or a resinous condensation product. Rust proof metal corner pieces 14 are provided to give the door a finished appearance. As shown in Figs. 2 and 3, the gasket 13 is of cambered cross-section, the lower side being concave and comprises a striking bead 15 having a flat side 16, a flange 17 extending from the striking bead, and an anchoring bead comprising projections 18 and 19 extending longitudinally along the opposite sides of the flange 17. As indicated in Fig. 2, the flange 17 forms an angle "a" of less than 180° with the flat side 16 of the bead 15, and increases in cross-section toward its edge remote from the bead 15. The shape of the gasket 13 is such that when it is placed on a flat surface it will be supported on the outer edge 16a of the bead 15 and on the anchoring projection 19. If the flange 17 is pressed toward the surface on which the gasket is supported, the gasket will be deformed and the outer edge of the striking bead will be pressed firmly against the supporting surface. It is evident, therefore, that when the gasket is in place in a refrigerator door the outer edge will be held securely against the door whether the door is open or closed and, consequently, dirt will not tend to collect beneath the gasket, and the gasket will not warp or curl away from the door.

When a door is to be fitted with a gasket, a length of gasket sufficient to go entirely around the door is selected and the portions of the gasket, which are to conform to the corners of the door, are notched as indicated at 20 in Fig. 3, the notch terminating at about the middle of the striking bead. As indicated in Fig. 1, the ends of the gasket 21 and 22 are arranged to meet on one side of the door. A continuous gasket formed in this manner provides a very effective seal for a refrigerator door when it is closed.

In Fig. 4, I have shown a cross-section of the refrigerator door shown in Fig. 1. The outer wall 11 is bent to form a door flange 23 having portion 24 substantially at right angles thereto. The strip 12 is secured to an inturned edge 10a on the inner wall 10 and to an inturned edge 24a on the portion 24, and connects the inner and outer walls. The strip 12 extends beyond the edge 24a and forms a recess 25 between the same and the flanges 23 and portion 24. When it is desired to secure the gasket 13 to the door it is placed in the position shown in Fig. 5, and a tool 26 having a blade portion 27 is used to force the anchoring bead into the opening 25, the projection 19 being placed against the flange 23, and the blade 27 forcing the flange into the recess 25 in the position shown in Fig. 5. When the gasket is in this position one edge 28 of the strip 12 presses the intermediate portion of the flange 17 toward the flange 23 of the door. This flexes or deforms the concave portion of the resilient gasket, and presses the outer edge 16a against the flange 23 of the door, the pressure being maintained because of the resilience of the gasket material, which transmits the stress produced by deformation of the gasket. The outer edge of the gasket is thus held against the door flange forming a narrow seat under relatively high concentrated pressure for the edge of the gasket, so that it will not warp or curl and dust or foreign matter cannot accumulate beneath the gasket. When the door is closed against a refrigerator cabinet such as that indicated in Fig. 5, the striking bead 15 will bear against a wall 29 of the cabinet and seal the door opening against leakage of air.

It is readily apparent from the foregoing, that I have provided a sealing gasket of neat appearance for refrigerator doors and the like, so constructed that the gasket does not warp and the accumulation of dust or other foreign matter beneath the gasket is effectively prevented.

While I have shown my invention as applied to the door of a refrigerator cabinet, other applications will readily be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States is:

1. A gasket for refrigerator cabinets and the like comprising a longitudinal strip of resilient material having a resilient striking bead on one side thereof and extending along said resilient strip near one longitudinal edge thereof, the other side of said resilient strip being concave in cross-section when unstressed, and an anchoring bead extending along the other longitudinal edge of said resilient strip for securing said strip to a cabinet structure, said longitudinal edge of said resilient strip near said striking bead forming a narrow seat under relatively high concentrated pressure for the edge of said gasket when positioned on the cabinet structure.

2. A gasket for refrigerator cabinets and the like comprising a longitudinal strip of resilient material having a hollow resilient striking bead on one side thereof and extending along said resilient strip near one longitudinal edge thereof, the other side of said resilient strip being concave in cross-section when unstressed, and an anchoring bead extending along the other longitudinal edge of said resilient strip and having portions projecting on either side of said strip for securing said gasket to a cabinet structure, said longitudinal edge of said strip near said striking bead forming a narrow seat under relatively high concentrated pressure for the edge of said gasket when positioned on the cabinet structure.

3. A gasket for refrigerator cabinets and the like comprising a hollow striking bead of resilient material having a flat side, a flat integral flange of resilient material projecting from said bead and forming an angle of less than 180° with the flat side thereof when unstressed, and an anchoring bead extending along the longitudinal edge of said flange remote from said striking bead for securing said gasket to a cabinet structure.

4. A gasket for refrigerator cabinets and the like comprising a hollow striking bead of resilient material having a flat side, a flat integral flange of resilient material projecting from said bead and forming an angle of less than 180° with the flat side thereof when unstressed, and an anchoring bead extending along the longitudinal edge of said flange remote from said striking bead and having portions projecting on either side of said flange for securing said gasket to a cabinet structure.

5. A gasket for refrigerator cabinets and the like comprising a longitudinal striking bead of resilient material having a substantially flat side, said gasket having a flange extending from said bead at an angle of more than 90° and less than 180° with respect to said flat side of said striking bead when unstressed and increasing in thickness away from said bead for supporting a portion of said bead above a flat surface on which said flat side of said bead and said flange of said gasket rest, and an anchoring bead extending along said flange on the side remote from said bead.

6. A refrigerator door including a flange on said door, a resilient sealing gasket having a concave cross-section when unstressed and presented to said flange, a striking bead along one edge of said gasket, an anchoring bead along the other edge of said gasket, and means including a portion of said door engaging the intermediate portion of said gasket between said striking bead and said anchoring bead and flexing said intermediate portion of said gasket to a position in which the concavity of the cross-section of said gasket is decreased for securing the edge of said gasket adjacent said striking bead against said flange to prevent the separation of said edge of said gasket and said flange.

7. A refrigerator door including a flange on said door, a resilient gasket including a striking bead having a flat side and an integral resilient flange extending from said bead at an angle less than 180° with respect to said flat side when unstressed, an anchoring bead along the edge of said flange remote from said striking bead, and means including a portion of said door engaging said gasket flange for flexing said gasket flange toward said door flange in a position in which the angle between said flange and said flat side is increased and for resiliently holding the outer edge of said striking bead against said door flange.

8. A refrigerator door including inner and outer walls spaced apart, a door flange formed in said outer wall, said inner and outer walls having inturned edges presented toward each other, means including a strip of thermally resistant material secured to said alined edges for connecting said inner and outer walls and for providing a gasket recess adjacent said door flange, a resilient sealing gasket having a concave cross-section when unstressed and presented to said door flange, a striking bead along one edge of said gasket, an anchoring bead along the other edge of said gasket, and means utilizing a portion of said strip for flexing said gasket toward said door flange to a position in which the concavity of the cross-section of said gasket is decreased and for resiliently securing said striking bead against said flange.

9. A gasket for refrigerator cabinets and the like comprising a longitudinal striking bead of resilient material having a substantially flat side, said gasket having an integral flange of resilient material extending from said bead and increasing in thickness away from said bead, the adjacent portions of said flange and said flat surface of said bead being arranged at an angle of less than 180° when said gasket is unstressed, the outer edge of said flat surface of said bead forming a narrow seat under relatively high concentrated pressure for the edge of said gasket when positioned on a cabinet structure, and an anchoring bead extending along said flange on the side remote from said striking bead.

10. A gasket for refrigerator cabinets and the like comprising a longitudinal hollow striking bead of resilient material having a substantially flat side, said gasket having an integral flange of resilient material extending from said bead and increasing in thickness away from said bead, the adjacent portions of said flange and said flat surface of said bead being arranged at an angle of less than 180° when said gasket is unstressed, the outer edge of said flat surface of said bead forming a narrow seat under relatively high concentrated pressure for the edge of said gasket when positioned on a cabinet structure, and an anchoring bead extending along said flange on the side remote from said striking bead and having portions projecting on either side of said flange for securing said gasket to the cabinet structure.

ETHAN W. VARS.